United States Patent Office 3,542,906
Patented Nov. 24, 1970

3,542,906
PRODUCTION OF BUTADIENE-STYRENE GRAFT COPOLYMERS WITH A CATALYST CONTAINING A NICKEL COMPLEX
Akira Onishi, Shiro Anzai, Toshio Yoshimoto, Koichi Irako, and Motoki Ishii, Tokyo, Japan, assignors to Bridgestone Tire Company Limited, Tokyo, Japan
No Drawing. Continuation-in-part of application Ser. No. 474,455, July 23, 1965. This application July 2, 1968, Ser. No. 741,907
Claims priority, application Japan, Aug. 16, 1964, 39/46,941; Sept. 3, 1964, 39/50,160; Sept. 14, 1964, 39/52,489
Int. Cl. C08d 1/30
U.S. Cl. 260—880
6 Claims

ABSTRACT OF THE DISCLOSURE

A process for manufacturing rubbery or plastic butadiene graft copolymers having a cis-1,4 content of at least 85% and substantially no gel, which comprises polymerizing butadiene, and copolymerizing styrene at a temperature of from 80° C. to 180° C., with a catalyst system consisting of (A) an organic metal complex compound of nickel, (B) a boron trifluoride etherate, boron trifluoride alcoholate or boron trifluoride phenolate and (C) a trialkylaluminum or dialkylalkoxyaluminum.

---

This application is a continuation-in-part of our co-pending application Ser. No. 474,455, "Production of Butadiene-Styrene Copolymers with a Catalyst Containing a Nickel Complex Carrier-Supported Nickel Oxide or Metallic Nickel Catalyst," filed July 23, 1965, and now abandoned.

This invention relates to a process for the production of butadiene-styrene or butadiene-α-alkylstyrene graft copolymer having a high cis-1,4-butadiene content, using a catalyst system consisting of (A) an organic complex compound of nickel, (B) a boron trifluoride etherate, boron trifluoride alcoholate or boron trifluoride phenolate and (C) a trialkylaluminum or dialkylalkoxyaluminum.

One object of the invention is to provide a highly useful catalyst system for the production of a butadiene graft copolymer having a high cis-1,4 content from butadiene and styrene or α-alkylstyrene.

Another object is to provide a useful low pressure process for obtaining a butadient graft copolymer, wherein butadiene is substantially completely polymerized in the presence of the above three component catalyst and graft-copolymerized with styrene or α-alkylstyrene at a temperature of 80° C. to 180° C.

Recently, in order to improve rubbers, plastics, or fibers or to provide novel copolymers, many studies for grafting various monomers to these rubbers, plastics and fibers have been made. For example, various attempts have been made in order to retain the advantages of cis-1,4-polybutadiene and improve the difficulties. Among them, if a graft copolymer copolymerized vinyl substituted aromatic hydrocarbon monomer to cis-1,4-polybutadiene is obtained, characteristic physical properties are expected.

However, it has been known that in general, when a polymer is grafted with the other monomer, the polymer in the solution or a dispersion in a solvent is added with a radical type catalyst or irradiated with radiation, light and the like; the graft efficiency of the resulting polymer is less than 50%, usually less than 30% and gelation is liable to be caused and undesirable results are brought about.

Recently, it has been reported that a useful high impact resin is obtained by grafting styrene to cis-1,4-polybutadiene produced by means of catalyst prepared from an organometallic compound and an iodine-containing compound by adding a radical catalyst (Japanese patent application publication No. 6,917/66). This catalyst for cis-1,4-polybutadiene has no polymerization activity for styrene and styrene acts only as a solvent. Accordingly, if in order to promote the polymerization of styrene, the copolymerization is effected by adding a radical type catalyst, for example, a peroxide catalyst (this catalyst has a function for inactivating the cis-1,4-polybutadiene catalyst), the resulting polymer consists of a mixture of polybutadiene-styrene graft polymer, homopolybutadiene and homopolystyrene.

The inventors have found unexpectedly that when butadiene is substantially completely polymerized by means of a nickel base three component catalyst and styrene or α-alkylstyrene is added and copolymerized thereto at an increased temperature, high cis-1,4-butadiene graft copolymers having substantially no gel can be easily synthesized in a high graft efficiency.

The process of the present invention is essentially different from the above described graft processes and has the following advantageous features.

(1) The catalyst for preparing the cis-1,4-butadiene graft copolymers of the present invention consists of three components, all or two of which are soluble in organic solvents, and by using three components wherein the A-component is a compound selected from organic nickel complexes, the soluble catalyst can be prepared by a simple procedure and, after polymerization, readily separated from the polymer by washing with alcohol, but the separation may be omitted because the catalyst is usually used in a small quantity and becomes harmless after being inactivated with alcohol, alcohol-ketone or the like.

Further, the catalyst of this invention is highly active and affords readily reproducible results.

(2) Butadiene graft copolymers produced by the process of the instant invention have high cis-1,4 contents of butadiene and substantially no gel. According to this invention, graft copolymers having cis-1,4 contents of at least 85% and substantially no gel are stably obtained without being affected by the ratio of the three components, catalyst preparation methods and copolymerization conditions.

This is one of the important characteristics of the catalyst of the invention.

(3) The present process gives graft copolymers having a high graft efficiency.

The graft efficiency to be used as an indication of graft copolymer is defined as follows:

$$\{(S_T - S_H)/S_T\} \times 100$$

In the above formula, $S_T$ is the total amount of styrene or α-alkylstyrene polymerized and $S_H$ is the amount of homopolystyrene or homopoly-α-alkylstyrene copolymerized.

It is considered that the copolymers of the present invention are graft copolymers, wherein the main chain is composed of high cis-1,4-polybutadiene and the side chain is composed of polystyrene, poly-α-alkylstyrene or a linking chain consisting mainly of said polymer.

The reason is based on the fact that (1) the production of the copolymers is two stage process and (2) as shown in Exmple 1 for producing the coplymer having a high long chain ratio, the number of linking chain of polystyrene or poly-α-alkylstyrene copolymerized to one molecule of cis-1,4-polybutadiene is more than 1 in average.

The copolymerization reaction of the present invention comprises the first stage for polymerizing butadiene into cis-1,4-polybutadiene and the second stage for copolymerizing styrene or α-alkylstyrene. In general, styrene or α-alkylstyrene undergoes thermal polymerization at a temperature of higher than 50° C., particularly higher than 100° C. to form the homopolymer, so that it has been considered that a temperature of higher than 100° C. is not preferable in the copolymerization in order to improve the activity, because the graft efficiency is decreased.

However, it has been found that in the present process using the catalyst according to the invention, the copolymerization activity can be considerably increased by effecting the copolymerization in the second stage at a temperature of 80° C. to 180° C., particularly, 100° C. to 160° C. and further that unexpectedly the graft efficiency is not decreased and rather is more improved than in case of a low polymerization temperature and the formation of gel does not substantially occur. It has been well known that the physical properties of the copolymer in a high graft efficiency are superior to those of a blend of polybutadiene with homopolymer of styrene or α-alkylstyrene.

(4) Other advantage of the present invention is that it is possible to adjust a length of linking chain of styrene or α-alkylstyrene to be grafted to polybutadiene. It is an important factor that the length of linking chain of styrene or α-alkylstyrene gives various characteristics to the physical properties.

(5) It is the other large advantage that the graft copolymers of the present invention have a lower solution viscosity than cis-polybutadiene and on the other hand, particularly, in a long chain ratio, the graft copolymers show a high Mooney viscosity. For example, the graft copolymer having a high graft efficiency (more than 90%) obtained by copolymerizing styrene to a cis-1,4-polybutadiene polymerization solution having an intrinsic viscosity of 3.26 in toluene at 30° C. and a Mooney viscosity of 58.0 at 100° C. contains 11.0% of styrene and shows an intrinsic viscosity of 3.05 and a Mooney viscosity of 115.0. These behaviors of the solution viscosity and the solid viscosity are very interesting and the resulting graft copolymers are very compatible with various oils by various means as in conventional rubbers or plastics and inexpensive oil extended graft copolymers can be easily obtained.

(6) This invention also relates to copolymers which have better heat aging properties and higher hardness than those of cis-1,4-polybutadiene with an identical modulus level.

Therefore, these copolymers are effective in improving the cornering force of tires by increasing the hardness of the tire stock without diminishing cut growth resistance with respect to groove crack resistance of tires.

According to the present invention, butadiene is reacted with a substance selected from the group consisting of styrene and α-alkylstyrene such as α-methylstyrene, α-ethylstyrene, α-propylstyrene or the like. It is preferred to employ styrene as the comonomer therewith.

The A-component of the catalyst is an organic complex compound of nickel, for example 1, hydroxyaldehyde complex compounds such as salicylaldehyde nickel, hydroxyketone complex compounds such as acetylacetone nickel, hydroxyester complex compounds such as acetacetic ethylester nickel, 8-hydroxyquinoline complex compounds such as 8-hydroxyquinoline nickel, and carbonyl complex compounds such as nickel tetracarbonyl. It is preferred to use a compound selected from the group consisting of acetacetic ethylester nickel, acetylacetone nickel, salicylaldehyde nickel, 8-hydroxyquinoline nickel and nickel tetracarbonyl.

Among these A-components, it is most preferable to employ an organic complex compound of nickel selected from acetylacetone nickel, acetacetic ethylester nickel, salicylaldehyde nickel, 8-hydroxyquinoline nickel and nickel tetracarbonyl.

The B component of the catalyst used for the process of the invention is a compound selected from the group consisting of boron trifluoride etherate, boron trifluoride alcoholate and boron trifluoride phenolate. It is preferred to use boron trifluoride ethyletherate, boron trifluoride ethylalcoholate or boron trifluoride phenolate.

The C component of the catalyst to be used for the process of this invention is a substance selected from the group consisting of trialkylaluminum compounds and dialkylalkoxyaluminum compounds, wherein alkyl group contains from 1 to 6, preferably 2 to 4 carbon atoms. It is preferable to employ triethylaluminum, tributylaluminum, triisobutylaluminum and diethylethoxyaluminum.

These A, B and C components of the catalyst have the same indispensable properties in regards to cis-1,4-butadiene graft copolymerization.

By selecting each component from the above list of preferred embodiments and combining them, preferable three-component catalysts can be obtained such as: acetylacetone nickel-boron trifluoride etherate-triethyl aluminum or triisobutylaluminum, acetacetic ethylester nickel-boron trifluoride etherate-triethylaluminum or triisobutylaluminum, salicylaldehyde nickel-boron trifluoride etherate-triethylaluminum or triisobutylaluminum, 8-hydroxyquinoline nickel-boron trifluoride etherate-triethylaluminum or triisobutylaluminum, acetylacetone nickel-boron trifluoride phenolate-triethylaluminum or triisobutylaluminum, acetylacetone nickel-boron trifluoride etherate-diethylethoxy-aluminum and nickel tetracarbonyl-boron trifluoride etherate-triethylaluminum or triisobutylaluminum. The catalyst is usually soluble, or in some cases, corpuscular in organic solvents. Said catalyst system is generally prepared by mixing the three components in an inert atmosphere and in a suitable diluent.

When the three-component catalysts are prepared by mixing the A, B and C components, the ratio of the mixture and the mixing temperature of these components, and other various factors influence the copolymerization. Among these conditions, the mixture ratio is an important factor. The mole ratio of said A component to said C component is within the range of 0.001 to about 4.0, preferably about 0.01 to about 1.0. The mole ratio of the C component to the B component is usually within the range of about 0.1 to about 5.0, preferably about 0.3 to about 2.0.

The catalyst system is prepared by admixing said three components in an anhydrous liquid hydrocarbon diluent generally at a temperature of between about —50° C. and about 80° C., preferably between about —5° C. and about 40° C. If necessary to modify the catalytic function of the system, aging or heat-treating thereof can be carried out after its preparation.

When the catalyst of the present invention is stored at room temperature, its activity remains unchanged over long periods of time.

The amount of catalyst used is not especially critical in this invention but it is employed usually less than 10 mole percent of total monomers charged.

It is desirable not to bring water, oxygen and the like into contact with the catalyst, but the effect of these materials on the graft copolymerization activity and the cis-1,4-orientating activity of the catalyst system is not particularly sensitive as that of Ziegler-type or Li-type catalysts, and, accordingly, it is to be understood that some of these materials can remain in the reaction mixture.

In an embodiment for the preparation of these copolymers, the polymerization of butadiene is effected, after which styrene or α-alkylstyrene is charged to the polymerization zone. In the present invention, the contacting of the butadiene with the catalyst system is effected at a temperature within the range of —30° C. to 150° C., preferably 0° C. to 100° C. and styrene or α-alkylstyrene is added to the polymerization zone and copolymerized at a temperature within the range of 80° C. to 180° C., preferably 100° C. to 160° C., in liquid phase, under a pressure sufficient to maintain the reaction system in liquid phase and under an inert atmosphere.

If the copolymerization is effected at a temperature of higher than 200° C., the graft efficiency decreases and gel is formed, so that such a temperature is not preferable. Butadiene polymerizes at a very satisfactory rate in the presence of the catalyst of this invention whereas styrene or α-alkylstyrene polymerizes slowly in comparison with the butadiene, but upon increasing the polymerization temperature as hereinbefore specified, the activity of the styrene or α-alkylstyrene polymerization is considerably improved and the graft efficiency of the copolymer is considerably high.

In the production of the graft copolymers, butadiene is polymerized in the first stage in the presence of the catalyst system of the invention and in this case, by adjusting the amount of butadiene in the reaction system after the first stage, the length of linking chain of styrene or α-alkylstyrene in the resulting graft copolymers can be adjusted as mentioned hereinafter. The adjustment of the amount of butadiene can be carried out by varying polymerization conversion ratio of butadiene, removing unreacted butadiene partially or completely or adding butadiene.

Copolymerization is effected by using butadiene and styrene or α-alkylstyrene substantially free of catalyst poisons.

The process of this invention is carried out in the presence of a hydrocarbon diluent. Aromatic hydrocarbons, paraffins and cycloparaffins are applicable. The preferred hydrocarbons of these types are those containing from 3 to 12 carbon atoms. Examples of diluents which can be used include propane, isobutane, n-pentane, n-hexane, n-heptane, benzine, isooctane, n-dodecane, cyclopentane, cyclohexane, methylcyclohexane, benzene, toluene, xylene, and the like. Mixtures of two or more of these hydrocarbons can be used, if desired.

The diluents should be substantially free of catalyst poisons such as oxygen, water and the like in order to effect the copolymerization efficiently.

Purification of solvents can be carried out by generally known methods.

These copolymers also have contents of cis-1,4-configuration of 85% or more, usually 90 to 98%.

The intrinsic viscosity of the graft copolymers after the two stage copolymerization is lower than that of usual polybutadiene, so that the stirring can be effected conveniently, the heat is easily diffused, the polymerization can be effected in a high concentration and at the same time the solid viscosity becomes larger and if necessary, the copolymer having Mooney viscosity of more than 100 can be easily obtained.

Among the structure of the graft copolymer, the length of linking chain of styrene or α-alkylstyrene gives various characteristics to the physical properties, so that it is a very important factor. The length of the linking chain can be determined by the oxidation decomposition process by means of a peroxide in the presence of osmium tetraoxide catalyst. Namely, when the graft copolymer of the present invention is subjected to an oxidation decomposition, only the linking chain of butadiene is completely decomposed and the linking chain of styrene or α-alkylstyrene remains in undecomposed state and when methanol is added thereto, the remaining chain having a polymerization degree of less than about 5 is soluble in methanol and the remaining chain having a polymerization degree of more than about 5 is insoluble in methanol. The molecular weight of the methanol insoluble linking chain can be determined by a conventional process. The ratio of the methanol insoluble linking chain shows the long chain ratio. Namely, the long chain ratio can be shown by the following formula.

$$\frac{S_R - S_H}{S_T - S_H} \times 100$$

In the above formula, $S_T$: the total amount of styrene or α-alkylstrene polymerized.

$S_H$: the amount of styrene or α-alkylstyrene polymer which has not been copolymerized, that is, homopolystyrene or homopoly-α-alkylstyrene (as mentioned above, it is a characteristic in the present invention that $S_H$ is small).

$S_R$: the amount of long chain styrene or α-alkylstyrene polymer obtained as methanol insoluble portion after the oxidation of the graft copolymer.

As to the relation of this long chain ratio to the physical properties, for example, the graft copolymer having a high long chain ratio is much larger in an increasing ratio of Mooney viscosity than the graft copolymer having a medium or low chain ratio and the vulcanized product of this graft copolymer is excellent in tensile strength, heat resistance, blow-out and on the other hand, the vulcanized product of the copolymer having a low long chain ratio is excellent in abrasion resistance, cut-gross, resilience and tear strength. As seen from this fact, the graft copolymers of the invention show individual characteristic according to the difference of the long chain ratio.

The adjustment of long chain ratio of styrene or α-alkylstyrene in the graft polymer of the invention can be easily effected by controlling an amount of butadiene in the reaction system. When the amount of butadiene in the second stage is suppressed to less than 5% of the amount of butadiene fed, the long chain ratio of the graft copolymer is more than 60%, usually, more than 80%. On the other hand, as the amount of butadiene in the reaction system of the second stage is larger, the long chain ratio decreases and the long chain ratio varies according to the polymerization condition, but the amount of butadiene in the second stage is usually more than 30% of the amount of butadiene fed and the long chain ratio is less than 20%.

The graft efficiency of styrene or α-alkylstyrene is more than 70% and usually 80–100%.

The microstructure of the butadiene units and the content of the styrene or α-alkylstyrene in the copolymers were determined according to infrared spectroscopic analysis. Intrinsic viscosities were determined in toluene at 30° C. Gel contents of these copolymers were measured by filtering their solution in benzene with 200-mesh wire gauze, and were substantially zero in the copolymers obtained from the catalyst system of the present invention.

After the completion of the polymerization, the separation of the catalyst can be effected in the following simple manner.

In the copolymerization wherein a soluble or a corpuscular catalyst is used, after the reaction, if necessary, a solvent containing a small percentage of phenyl-β-naphthylamine is added to dissolve the copolymer completely or to lower the viscosity of the reaction mixture, and the mixture is poured into a large quantity of nonsolvent, such as methanol, isopropylalcohol, or methanolacetone to precipitate the copolymer. For example, the copolymer prepared with a three-component catalyst of acetylacetone nickel, boron trifluoride etherate and triethylaluminum has a brown color because of the remaining catalyst, but it changes to a white copolymer gradually by washing several times with methanol.

Because the catalyst of this invention is highly active, the synthesis of cis-1,4-butadiene graft-copolymers can be effected with a very small quantity thereof. As the catalyst is substantially soluble in suitable diluents which do not dissolve the polymer, such as alcohol, acetone and the like, the catalyst is separated very easily from the polymer by washing with the above mentioned diluents. When a pure polymer is not necessary, it can be used without taking pains to eliminate the catalyst as its content is very small and it is harmless.

The graft copolymers of the invention have wide properties from rubbery state to resinous state only by changing the composition of monomer units contained in the graft copolymer and can be applied to various uses. For example, when the graft copolymer having a styrene content of 5 to 30% is used for tire rubber, such graft copolymer can provide tire by the same compounding, vulcanization and molding as used in conventional natural rubber and this tire has characteristic properties in heat resistance, abrasion resistance, skid resistance and the like. As the other example, a high styrene copolymer can be easily molded by a conventional working process for plastics and has a high utility as high impact resin.

The following examples are given to illustrate a preferred method of operating according to the present invention.

EXAMPLE 1

A 300-ml. pressure bottle was dried thoroughly and purged with dried nitrogen. Then, into the pressure bottle were added 62.2 ml. of dried toluene, 0.127 mmol of acetylacetone nickel and 0.425 mmol of boron trifluoride etherate. After standing for 10 minutes, 0.425 mmol of triethylaluminum was added therein, and the resulting mixture was reacted for 10 minutes to prepare a catalyst. Each of the above mentioned operations was effected at 20° C.

The catalyst system was cooled to −78° C. and added with 0.25 mol of butadiene, and a polymerization was effected at 40° C. for 3 hours. The polymerization conversion of butadiene was 98.0%. Then, 0.25 mol of styrene was added to the resulting system and a copolymerization reaction was effected at 140° C. After 3 hours, methanol containing a small amount of phenyl-β-naphthylamine was added to the polymerization system to stop the reaction, whereby the resulting copolymer was precipitated. The copolymer was a strong rubbery elastic copolymer. The yield was 48.3%.

From infrared analysis, the copolymer contained 35.0% of styrene and 96.2% of cis-1,4 bond. The copolymer had an intrinsic viscosity of 1.95 and no gel. It was apparent from the following three reasons that the reaction product was a graft copolymer.

(1) A two-stage copolymerization reaction is adopted.

(2) When styrene is added and copolymerized with polybutadiene in such a state that there is substantially no butadiene monomer in the reaction system, and the number of polystyrene chains copolymerized with one molecule of polybutadiene is larger than 1 in average.

(3) Butadiene unit and styrene unit are bonded chemically.

The reason (3) was verified by the two phase-fractional extraction method using n-hexane and N,N'-dimethylformamide (hereinafter abridged as DMF), by which the homopolymers can be separated quantitatively from the mixture.

Namely, 1 g. of the reaction product is dissolved in 200 ml. of n-hexane and the resulting solution is put into a separating funnel. Then, 100 ml. of DMF are added thereto, shaken and left to stand. The resulting solution is separated into two layers, and homopolystyrene is dissolved selectively in the lower DMF layer. 100 ml. of fresh DMF are added to the upper hexane layer and further extraction and separation are effected. The first and the second DMF layers are combined and DMF is removed by drying under vacuum and the resulting homopolystyrene is weighed.

Thus, the graft efficiency defined in the specification can be determined.

On the other hand, it has been confirmed that the blend of polybutadiene with polystyrene can be separated completely into each homopolymer by the above mentioned process (i.e., the graft efficiency is 0).

The reason (2) was verified by cutting the double bond of polybutadiene in the main chain by oxidation decomposition after confirming the high graft efficiency, recovering the side chain of styrene polymer and determining the molecular weight.

The oxidation decomposition was carried out according to the method disclosed by I. M. Kolthoff et al. (J. Polymer Sci., 1 429 (1946)), in which osmium tetraoxide and tert-butylhydroxy peroxide are used, and it was effected after it was confirmed that polybutadiene was decomposed completely and polystyrene was not decomposed. After the decomposition, the long chain ratio as defined in the specification was calculated.

The reaction product in Example 1 had a graft efficiency of 92.1% and a long chain ratio of 95.3%. Furthermore, it was found that five polystyrene side chains were bonded to one polybutadiene main chain in average from the molecular weight of the polybutadiene in the main chain, and the polystyrene in the side chain and the styrene content of the reaction product.

EXAMPLE 2

The reaction was carried out in the same manner as described in Example 1, except that a catalyst prepared from 0.0463 mmol of salicylaldehyde nickel, 0.463 mmol of boron trifluoride etherate and 0.463 mmol of triethylaluminum, and a mixed solvent of toluene and n-hexane in a volume ratio of 1:1 were used, and polymerization time of butadiene was 2 hours. The yield of the resulting graft copolymer was 57.9%. The styrene content, cis-1,4 content and graft efficiency of the graft copolymer were 33.8%, 93.2% and 93.0% respectively.

EXAMPLE 3

After the polymerization conversion of butadiene reached 70% in the same manner as described in Example 1, styrene was graft copolymerized. The yield of graft copolymer was 45.7%. The styrene content, cis-1,4 content, graft efficiency and long chain ratio of the resulting copolymer were 31.3%, 95.8%, 91.9% and 8.4% respectively.

These facts show that the amount of remaining butadiene monomer, which depends upon the polymerization conversion of butadiene, has a high influence upon the long chain ratio.

What is claimed is:

1. A process for manufacturing cis-1,4-butadiene graft copolymers having a cis-1,4 content of at least 85% and substantially no gel, which comprises substantially completely polymerizing butadiene with a catalysts at a temperature within the range of −30° C. to 150° C., and graft copolymerizing onto the thus formed polybutadiene with a graft efficiency of more than 70% a comonomer selected from the group consisting of styrene and α-alkylstyrene at a temperature within the range of 80° C. to 180° C., wherein said process is carried out in the presence of a hydrocarbon diluent containing from 3 to 12 carbon atoms, under sufficient pressure to maintain the reaction system in the liquid phase, and under an inert atmosphere, said catalyst having three components consisting of (A) a compound selected from the group consisting of hydroxyester nickel complex, hydroxyketone nickel complex, 8-hydroxyquinoline nickel complex, hydroxyaldehyde nickel complex and nickel tetracarbonyl, (B) a compound selected from the group consisting of boron trifluoride etherate and boron trifluoride alcoholate and boron trifluoride phenolate and (C) a compound selected from the group consisting of trialkylaluminum and dialkylalkoxyaluminum, wherein alkyl group contains from 1 to 6 carbon atoms, the total amount of said catalyst being less than 10.0 mol percent of total monomers, the mole ratio of said (A) component to said (C) component being within the range of 0.001 to 4.0 and the mole ratio of said (C) component to said (B) component being within the range of 0.1 to 5.0.

2. A process according to claim 1, wherein said component (A) is acetylacetone nickel.

3. A process according to claim 1, wherein said component (B) is boron trifluoride ethyl etherate.

4. A process according to claim 1, wherein said component (C) is triethylaluminum.

5. A process according to claim 1, wherein said cis-1,4-butadiene graft copolymer is a cis-1,4-butadiene styrene graft copolymer.

6. A process for manufacturing cis-1,4-butadiene graft copolymers having a cis-1,4 content of 90% to 98% and substantially no gel, which comprises substantially completely polymerizing butadiene with a catalyst at a temperature within the range of 0° C. to 100° C., and graft copolymerizing styrene onto the thus formed polybutadiene with a graft efficiency of styrene of 80 to 100%, at a temperature within the range of 100° C. to 160° C., wherein said process is carried out in the presence of a hydrocarbon diluent containing from 3 to 12 carbon atoms, under sufficient pressure to maintain the reaction system in the liquid phase, and under an inert atmosphere, said catalyst having three components consisting of (A) a compound selected from the group consisting of hydroxyketone nickel complex and hydroxyaldehyde nickel complex, (B) a boron trifluoride etherate and (C) a trialkylaluminum, wherein alkyl group contains from 2 to 4 carbon atoms, the total amount of said catalyst being less than 10.0 mol percent of total monomers, the mole ratio of said (A) component to said (C) component being within the range of 0.01 to 1.0 and the mole ratio of said (C) component to said (B) component being within the range of 0.3 to 2.0.

References Cited

UNITED STATES PATENTS

| | | | |
|---|---|---|---|
| 3,068,180 | 12/1962 | Van Amorangen et al. | 252—429 |
| 3,070,587 | 12/1962 | Zelinski | 260—94.3 |
| 3,170,905 | 2/1965 | Ueda et al. | 260—94.3 |
| 3,165,503 | 1/1965 | Kahn et al. | 260—94.3 |
| 3,215,682 | 11/1965 | Farrar et al. | 260—94.3 |

FOREIGN PATENTS 820,089 9/1959 Great Britain.

ALLAN LIEBERMAN, Primary Examiner